(12) United States Patent
Warren et al.

(10) Patent No.: US 10,429,225 B2
(45) Date of Patent: Oct. 1, 2019

(54) SCOOPING AND DISPENSING DEVICE

(71) Applicant: K3 Enterprises, LLC, Yuba City, CA (US)

(72) Inventors: William Penn Warren, Yuba City, CA (US); Martin Adolfo Mendieta, Yuba City, CA (US); Douglas Patrick Gibbs, Yuba City, CA (US); Kenneth Raymond Gibbs, Yuba City, CA (US)

(73) Assignee: K3 Enterprises, LLC, Yuba City, CA (US)

( * ) Notice: Subject to any disclaimer, the term of this patent is extended or adjusted under 35 U.S.C. 154(b) by 111 days.

(21) Appl. No.: 15/646,893

(22) Filed: Jul. 11, 2017

(65) Prior Publication Data

US 2018/0010946 A1 Jan. 11, 2018

Related U.S. Application Data

(60) Provisional application No. 62/493,671, filed on Jul. 11, 2016.

(51) Int. Cl.
*B67C 11/02* (2006.01)
*G01F 19/00* (2006.01)
*B65D 83/06* (2006.01)
*B67C 11/00* (2006.01)

(52) U.S. Cl.
CPC ........... *G01F 19/002* (2013.01); *B65D 83/06* (2013.01); *B67C 11/02* (2013.01); *B67C 2011/20* (2013.01); *B67C 2011/40* (2013.01)

(58) Field of Classification Search
CPC ..... B67C 2011/20; B67C 11/04; B65D 83/06; B65D 77/245; B65D 2517/0034; G01F 19/002; B65B 39/00; B65B 39/003
USPC ........ 141/344, 345, 384; 294/176, 178, 179; 606/92
See application file for complete search history.

(56) References Cited

U.S. PATENT DOCUMENTS

| 5,236,021 A | 8/1993 | Bewlay |
| 6,592,159 B1 | 7/2003 | Masri |
| 6,974,056 B2 | 12/2005 | Rea |
| 2013/0119093 A1* | 5/2013 | Thomson ................ B67C 11/04 222/560 |

(Continued)

OTHER PUBLICATIONS https://thescoopie.com; Website for Portable Scoop and Funnel.
(Continued)

*Primary Examiner* — Marina A Tietjen
*Assistant Examiner* — Paul J Gray
(74) *Attorney, Agent, or Firm* — Neustel Law Offices

(57) ABSTRACT

A scooping and dispensing device for efficiently storing, measuring, transferring, mixing, and/or dispensing materials such as powders. The scooping and dispensing device generally includes a funnel and a cover rotatably connected within the funnel. The cover is adapted to be rotated between a plurality of rotational positions with respect to the funnel. A handle may be grasped and rotated; with the handle being connected to the cover such that both the handle and cover rotate together. The cover may thus be rotated to an inverted position to form a chamber to store or mix one or more materials. A cap is removably connected to the lower opening of the funnel; with the cap being removed from the lower opening to dispense the material(s) out of the funnel.

19 Claims, 17 Drawing Sheets

(56) References Cited

U.S. PATENT DOCUMENTS

2013/0295216 A1* 11/2013 LeGreve ............... A47J 43/282
                                                    425/279
2014/0083555 A1*  3/2014 Allen .................. G01F 19/002
                                                      141/1
2014/0110019 A1*  4/2014 Keefe .................. A47J 31/404
                                                    141/345

OTHER PUBLICATIONS https://us.myprotein.com/protein-accessories/myprotein-plastic-scoop-large/10873323.html; Myprotein Plastic Scoop Large Product Page.
https://jet.com/product/ScoopMate-Powder-Scoop-Holder-Protein-Scoop-Holder-Keeps-Your-Scoop-On-Top-Every/9a020d2e8d5747cc862e08be9cf6bbf3; Product Page ScoopMate.
https://www.amazon.com/Fooper-Foop1VE/dp/B00LP4PST8/ref=lp_12092932011_1_1?srs=12092932011&ie=UTF8&qid=1499782135&sr=8-1; Fooper Kitchen Tool Amazon Product Page.
https://www.amazon.com/dp/B00IOO2YSK; BlenderBottle Prostack System with 22 oz Bottle and Twist n Lock Storage Amazon Product Page.
https:https://www.amazon.com/Flipfunnel-3-Each/dp/B00L4N4OHC/ref=lp_9683773011_1_1?srs=9683773011&ie=UTF8&qid=1499783184&sr=8-1; Flipfunnel Amazon Product Page.
https://www.amazon.com/Shoot-Shake-New-Improved-Funnel/dp/B017XMABNI; Shoot N Shake Amazon Product Page.
https://www.amazon.com/Stainless-Steel-Coffee-Protein-Powder/dp/B01M4IFIAR/ref=sr_1_1?ie=UTF8&qid=1499787589&sr=8-1&keywords=protein+powder+scoop+clip;Scoop Clip.

* cited by examiner

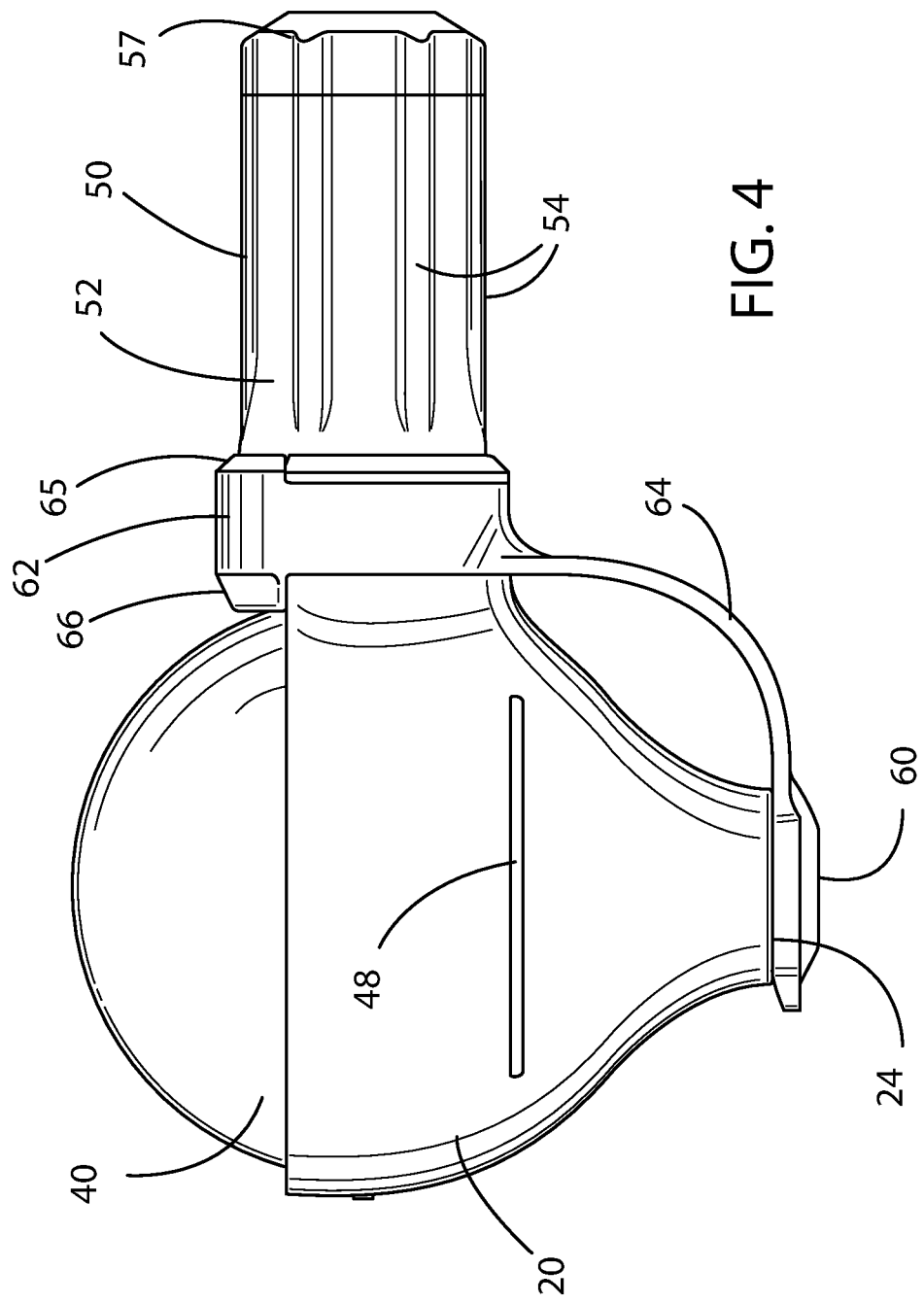

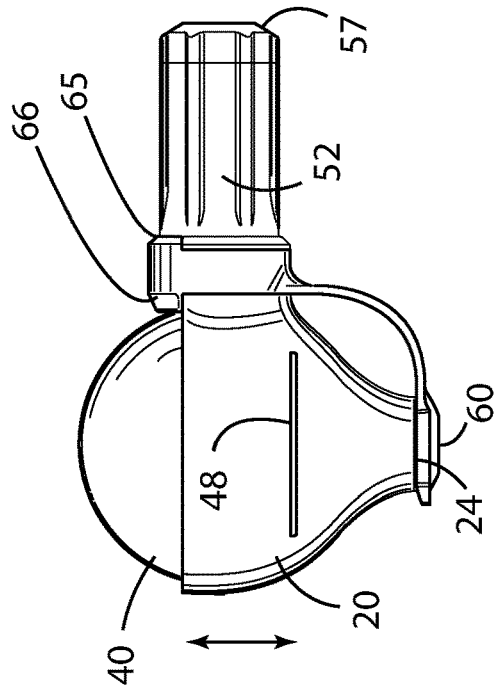
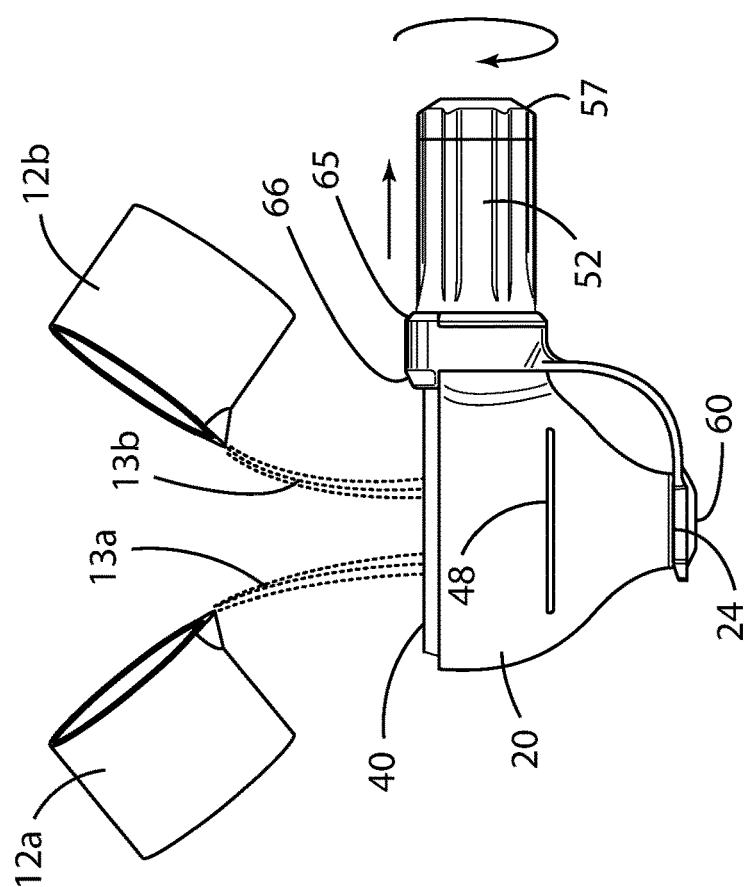
FIG. 11
FIG. 10

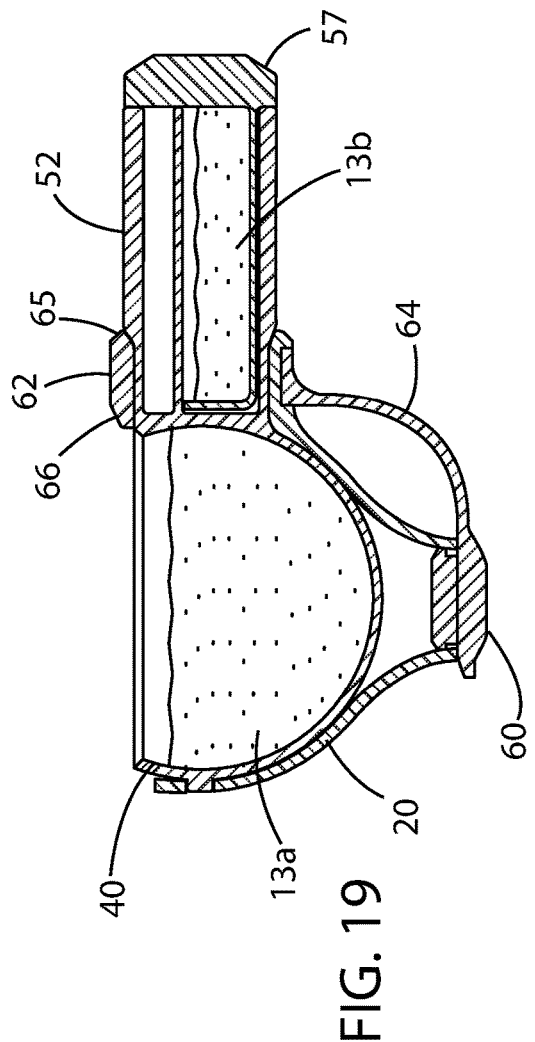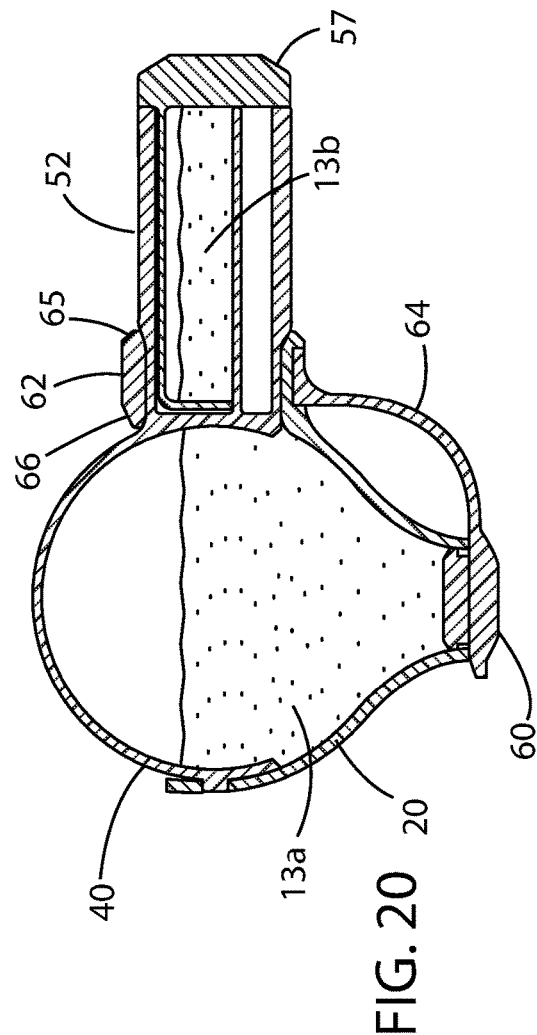

SCOOPING AND DISPENSING DEVICE

CROSS REFERENCE TO RELATED APPLICATIONS

I hereby claim benefit under Title 35, United States Code, Section 119(e) of U.S. provisional patent application Ser. No. 62/493,671 filed Jul. 11, 2016. The 62/493,671 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to a scooping and dispensing device for efficiently storing, measuring, transferring, mixing, and/or dispensing materials such as powders.

Related Art

Any discussion of the related art throughout the specification should in no way be considered as an admission that such related art is widely known or forms part of common general knowledge in the field.

There are various products commercially available in powdered form that require careful measuring and transferring of a product from its original bulk container to a second container. There are circumstances in which similar careful measuring and transferring of a powdered substance must be conducted into an opening, into which the powdered substance is to be dispensed, and is significantly smaller than the open side of the funnel or scoop. For example, powdered nutritional supplements, baby formula and powdered drink concentrates typically are available to consumers in large tubs. It is suggested to combine and mix these powdered substances with liquids such as, for example, water, and/or fruit juices. However, most users need to combine the powdered nutritional supplements and powdered drink concentrates into single use sports bottles, baby bottles, or commercially available bottled water containers.

Commonly, these single use bottles and bottled water containers have small openings, sometimes as small as 18 mm in diameter. The scoops provided with the powdered nutritional supplements, infant formula and drink concentrates are often much greater in diameter such that it is difficult to dispense the powdered nutritional supplements and physical enhancers into the small opening without spilling the powdered substances outside of the bottle, thereby creating a mess and a loss of product. This difficulty in pouring the powdered substance is due to the relatively high coefficient of static friction combined with the relatively low dynamic friction seen in the movement of powdered substances.

These forces, called Van der Waals' Forces, are responsible for this phenomenon that affects the pourability and flowability of powdered substances including baking, infant formula, talc, concentrated powered drink mixes, nutritional supplements, etc. For many powders with unfavorable Van der Waals' Forces, dispensing requires air pressurization, specially designed delivery cones or mechanical action such as tapping, ultrasonic agitation, auger, or shaking. Moreover, there appear to be few options that allow the user to accurately measure and scoop the powder or other powdered substance, and to then subsequently transport the scoop for dispensing into liquid at a later time.

Powdered or dry granular ingredients are used in a variety of applications where a container, cup, or scoop is used to scoop a single serving of powdered nutritional supplements, infant formula or drink concentrates from a bulk container, and then dispense that powder into another container for mixing and consumption. In 2015, growth was driven by the rapid expansion of its demographic base. While sports nutrition products previously targeted core athletes and body builders, casual users have begun using the products as they are more aware of protein's health benefits. Aging demographics support growth in supplement use. Sports nutrition manufacturers are responding by launching new products in more convenient formats and wider distribution in new channels (i.e., Box stores and grocery).

It can be appreciated that funnel and scooping devices for the collection and transferring of powdered substances have been in use for many years. When mixing a powder or granular material with a liquid, it is common to use a measuring cup to scoop the material from a bulk container, and pour it into a single use container for mixing with water or juice. When pouring a powdered substance into a container having a relatively small opening, such as a water bottle, baby bottle, sport bottle or canister, it is difficult to direct the powder into the opening of the container without spilling some of the powder.

It can be appreciated that powdered material transfer devices and methods have been in use for years. Typically, powdered nutritional supplements, infant formula, and drink concentrates have been scooped, transported, and dispensed in many ways but none that provide ease of use, compactness, and measurement such as our invention described herein.

The main problem with conventional funnels and scoops for transferring bulk powdered substances is that they are designed for larger volumes—as much as 160 cc—concentrations typical for an 8-12 ounce single use container or bottle. Typically, these bulk materials use a pliable scoop produced of polypropylene or other moldable thermoplastic. The dispensing method from these standard flexible scoops is to place the scoop over a bottle, tipping it and shaking out the powered substance. The cup is flexible, and the user generally pinches the cup to reduce the exit dimension and reduce spillage. Often times, due to the effects of Van der Waals' Forces, significant spillage or clumping of the powdered substance occurs. Additionally, dispensing a measured powder in this normal way does not accommodate a targeted transfer of the powder into containers having small entry openings such as baby bottles, bicycle water bottles, or single use commercial bottles of water.

While the common method of scooping and transferring powdered substances from a bulk container to a single use container is by using a thin flexible Polypropylene scoop, that process is cumbersome, inaccurate, and has many shortcomings including their inability to hold and store the powdered substance for dispensing and mixing at a later time.

SUMMARY

An example embodiment is directed to a scooping and dispensing device. The scooping and dispensing device includes a funnel and a cover rotatably connected within the funnel. The cover is adapted to be rotated between a plurality of rotational positions with respect to the funnel. A handle may be grasped and rotated; with the handle being connected to the cover such that both the handle and cover rotate together. The cover may thus be rotated to an inverted position to form a chamber to store or mix one or more materials. A cap is removably connected to the lower opening of the funnel; with the cap being removed from the lower opening to dispense the material(s) out of the funnel.

There has thus been outlined, rather broadly, some of the embodiments of the scooping and dispensing device in order that the detailed description thereof may be better understood, and in order that the present contribution to the art may be better appreciated. There are additional embodiments of the scooping and dispensing device that will be described hereinafter and that will form the subject matter of the claims appended hereto. In this respect, before explaining at least one embodiment of the scooping and dispensing device in detail, it is to be understood that the scooping and dispensing device is not limited in its application to the details of construction or to the arrangements of the components set forth in the following description or illustrated in the drawings. The scooping and dispensing device is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 4 is a perspective view of a scooping and dispensing device with the cap connected and the cover in the second, inverted position in accordance with an example embodiment.

FIG. 10 is a side view of two different materials being introduced into the cover of a scooping and dispensing device in accordance with an example embodiment.

FIG. 11 is a side view of the two materials being mixed together within a scooping and dispensing device in accordance with an example embodiment.

FIG. 19 is a side sectional view of a scooping and dispensing device with the cover in the first position and materials stored in the scoop insert in accordance with an example embodiment.

FIG. 20 is a side sectional view of a scooping and dispensing device with the cover in the second position and materials stored in the scoop insert in accordance with an example embodiment.

DETAILED DESCRIPTION

Figure 1:
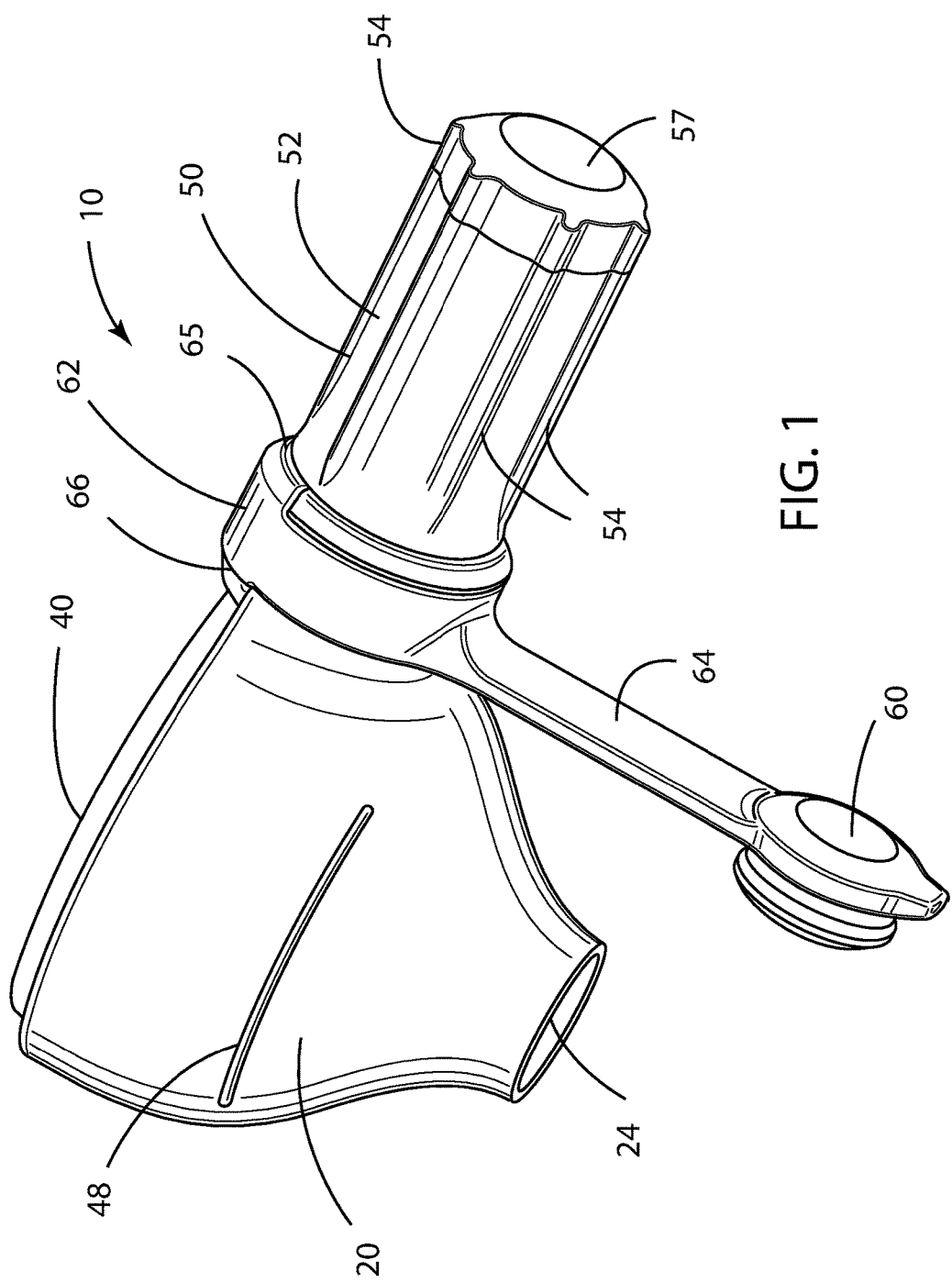
FIG. 1 is a perspective view of a scooping and dispensing device with the cover in a first position in accordance with an example embodiment.

A. Overview.

An example scooping and dispensing device generally comprises a funnel 20 and a cover 40 rotatably connected within the funnel 20. The cover 40 is adapted to be rotated between a plurality of rotational positions with respect to the funnel 20. A handle 50 may be grasped and rotated; with the handle 50 being connected to the cover 40 such that both the handle 50 and cover 40 rotate together. The cover 40 may thus be rotated to an inverted position to form a chamber 26 to store or mix one or more materials 13. A cap 60 is removably connected to the lower opening 24 of the funnel 20; with the cap 60 being removed from the lower opening 24 to dispense the material(s) 13 out of the funnel 20.

In an exemplary embodiment, the scooping and dispensing device 10 may comprise a funnel 20 including an upper opening 23 and a lower opening 24. The funnel 20 may include a passage 27 between the upper opening 23 and the lower opening 24. A cover 40 may be rotatably connected to the funnel 20; the cover 40 being adapted to rotatably adjust between a first position blocking the passage 27 of the funnel 20 and a second position covering the upper opening 23 of the funnel 20. A handle 50 may be connected to the cover 40 such that the handle 50 may be rotated to rotate the cover 40 between the first position and the second position. A cap 60 is removably connected to the lower opening 24 of the funnel 20; the cap 60 being removed to allow materials 13 to be dispensed through the lower opening 24 of the funnel 20.

In the first position, the cover 40 does not cover the upper opening 23 of the funnel 20 and in the second position the cover 40 does not block the passage 27 of the funnel 20. The funnel 20 may be cone-shaped and comprise a cover opening 44 and a cover cavity 45. The cover 40 may be semi-spherical shaped and may include a plurality of indicia 48 adapted to indicated a volume of a material 13 within the cover cavity 45. The cover cavity 45 is exposed to receive a material 13 when the cover 40 is in the first position.

A cap mount 62 may be connected between the handle 50 and the funnel 20. The cap 60 may be connected to the cap mount 62 by a flexible cap connector 64 which suspends the cap 60 from the cap mount 62 when the cap 60 is not connected to the funnel 20.

Figure 18:
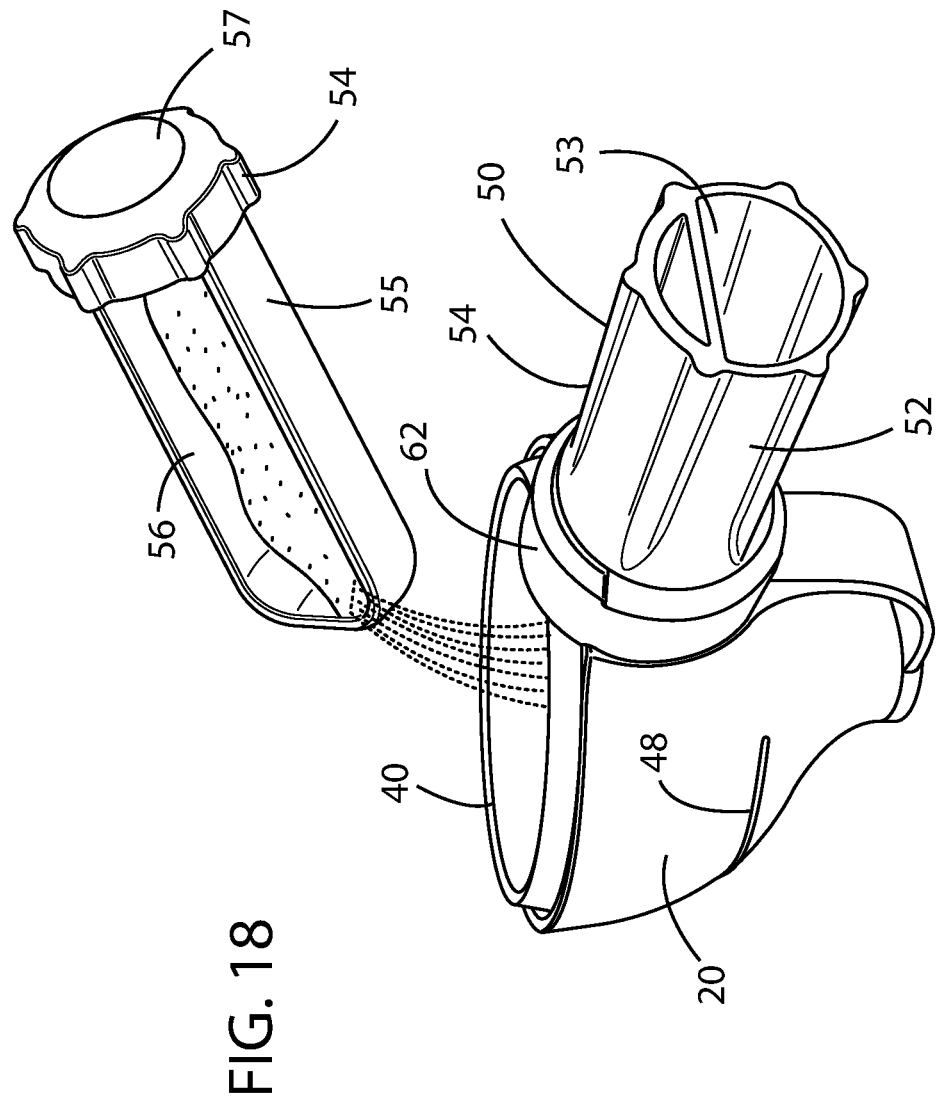
FIG. 18 is a rear perspective view of a scoop insert being used to pour materials into a scooping and dispensing device in accordance with an example embodiment.

The handle 50 may include a grip portion 52 which includes a receiver opening 53 and a scoop insert 55 slidably connected within the receiver opening 53. The scoop insert 55 may comprise a scoop cavity 56 adapted to transfer a material 13 into the cover 40 when the cover 40 is in the first position. The scoop insert 55 may be utilized for a wide range of functions. For example, the scoop insert 55 may be utilized to transfer materials 13 into the cover 40 such as shown in FIG. 18. The scoop insert 55 may also be utilized to store materials 13 separate from the funnel 20 and cover 40 such as shown in FIGS. 19 and 20. For example, a first material 13 could be stored in the chamber 26 and a second material 13 could be stored in the scoop insert 55 within the handle 50.

The rotation of the cover 40 between the first and second positions will transfer the material 13 from the cover cavity 45 to a funnel cavity 25 of the funnel 20. The upper opening 23 of the funnel 20 is preferably larger than the lower opening 24 of the funnel 20. The funnel 20 may include a first locking member 34 and the cover may include a second locking member 47; with the first locking member 34 being adapted to selectively engage with the second locking member 34 to lock the cover in the first position or the second position. The first locking member 34 may comprise a rib and the second locking member 47 may comprise a slot for selectively engaging with the rib.

B. Funnel.

As shown throughout the figures, a funnel 20 is utilized to store, mix, transfer, and/or dispense materials 13. The funnel 20 generally comprises a front end 21, a rear end 22, an upper opening 23, and a lower opening 24. The shape, size, and configuration of the funnel 20 may vary widely in different embodiments and thus should not be construed as limited by the exemplary figures.

In one embodiment as best shown in FIGS. 1-8, the funnel 20 comprises a lower opening 24 which is narrower than its upper opening 23. The funnel 20 may include a passage 27 extending between the upper and lower openings 23, 24. The passage 27 may be tapered such that the passage 27 narrows between the upper opening 23 and the lower opening 24 to naturally force materials 13 down toward the lower opening 23. The funnel 20 may comprise a cone-shaped configuration as shown in the figures, or may comprise other shapes. While the upper and lower openings 23, 24 are both illustrated as being circular, it should be appreciated that other shapes of openings 23, 24 may be utilized in different embodiments.

Figure 2:
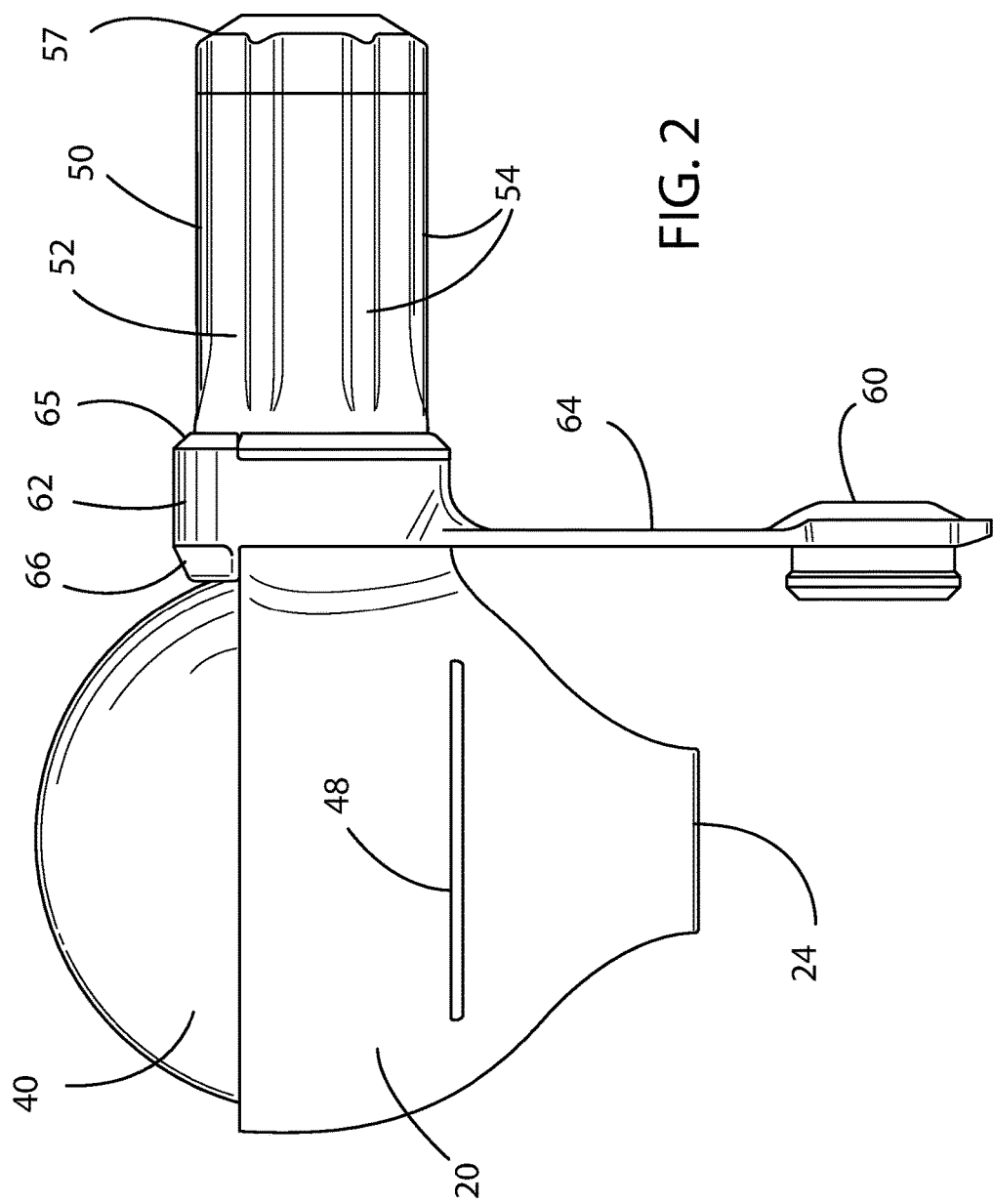
FIG. 2 is a side view of a scooping and dispensing device with the cover in a second, inverted position in accordance with an example embodiment.
Figure 7:
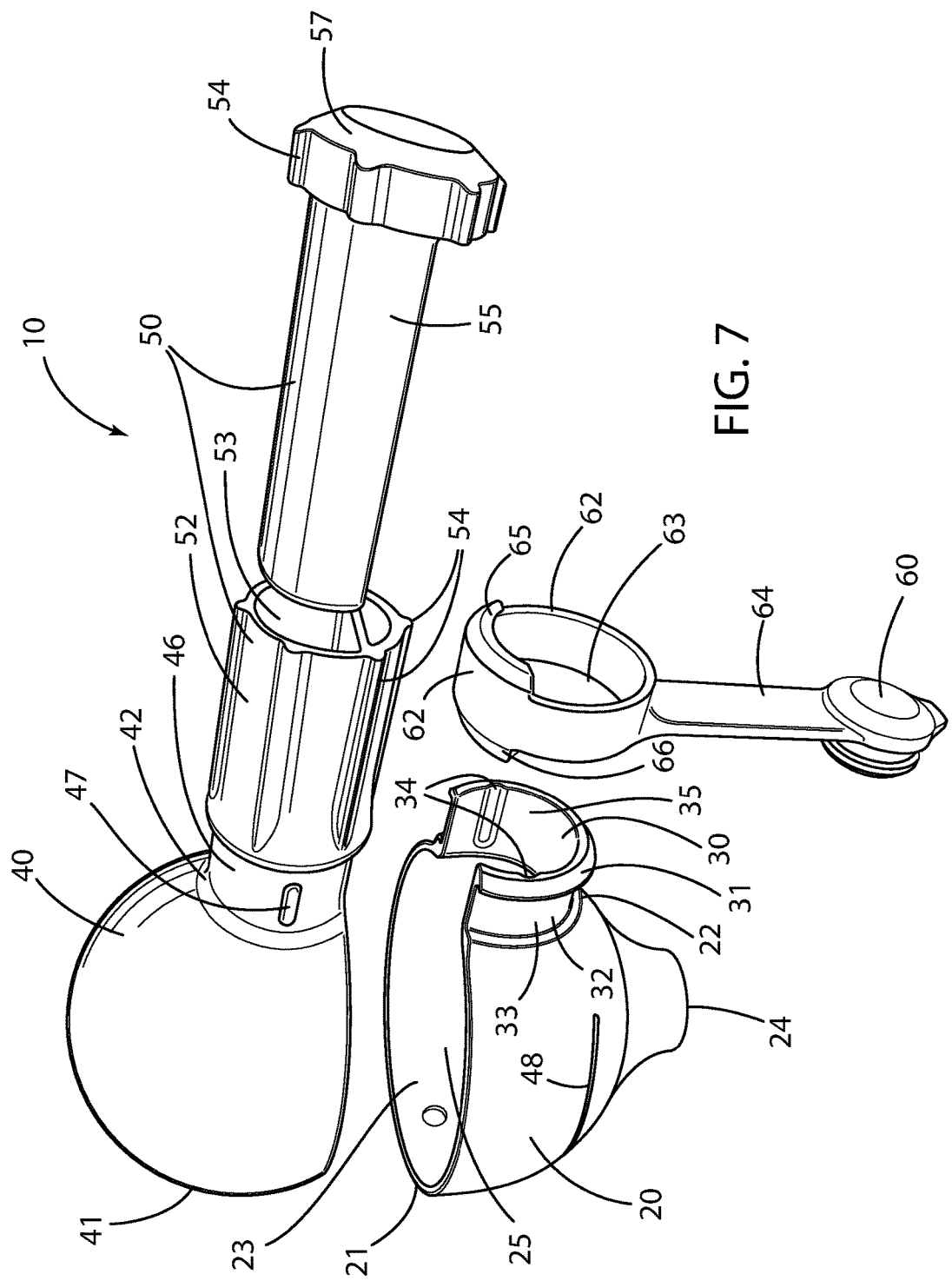
FIG. 7 is an exploded perspective view of a scooping and dispensing device in accordance with an example embodiment.
Figure 8:
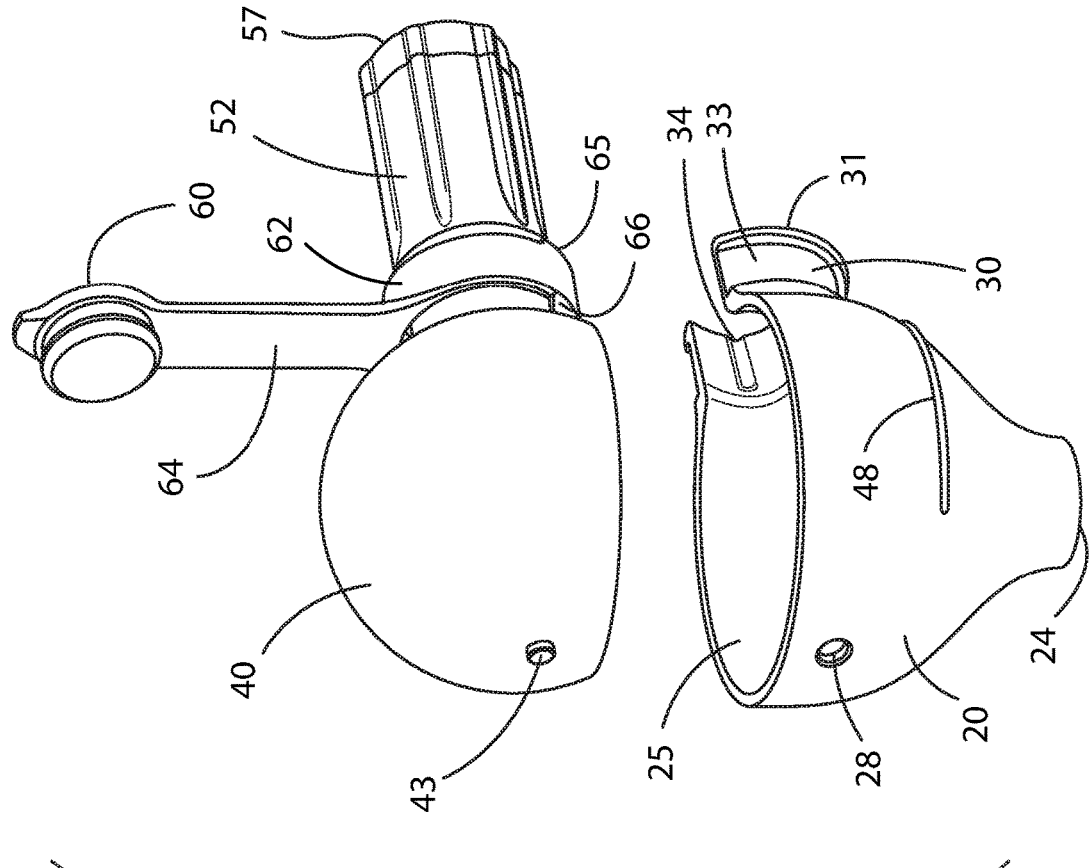
FIG. 8 is a side exploded perspective view of a scooping and dispensing device in accordance with an example embodiment.
Figure 9:
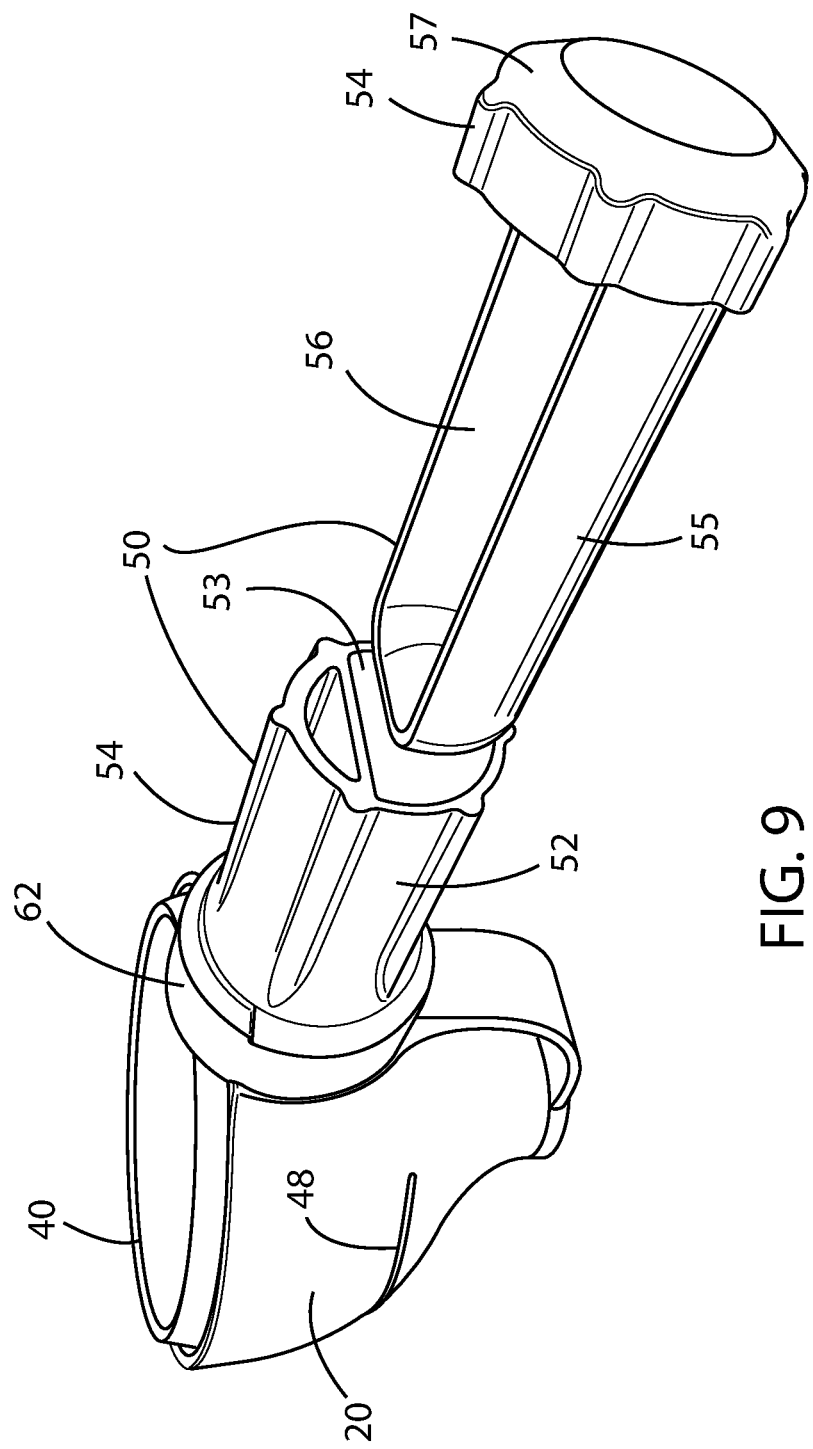
FIG. 9 is a rear perspective view of a scooping and dispensing device with the inner member of the handle removed in accordance with an example embodiment.
Figure 12:
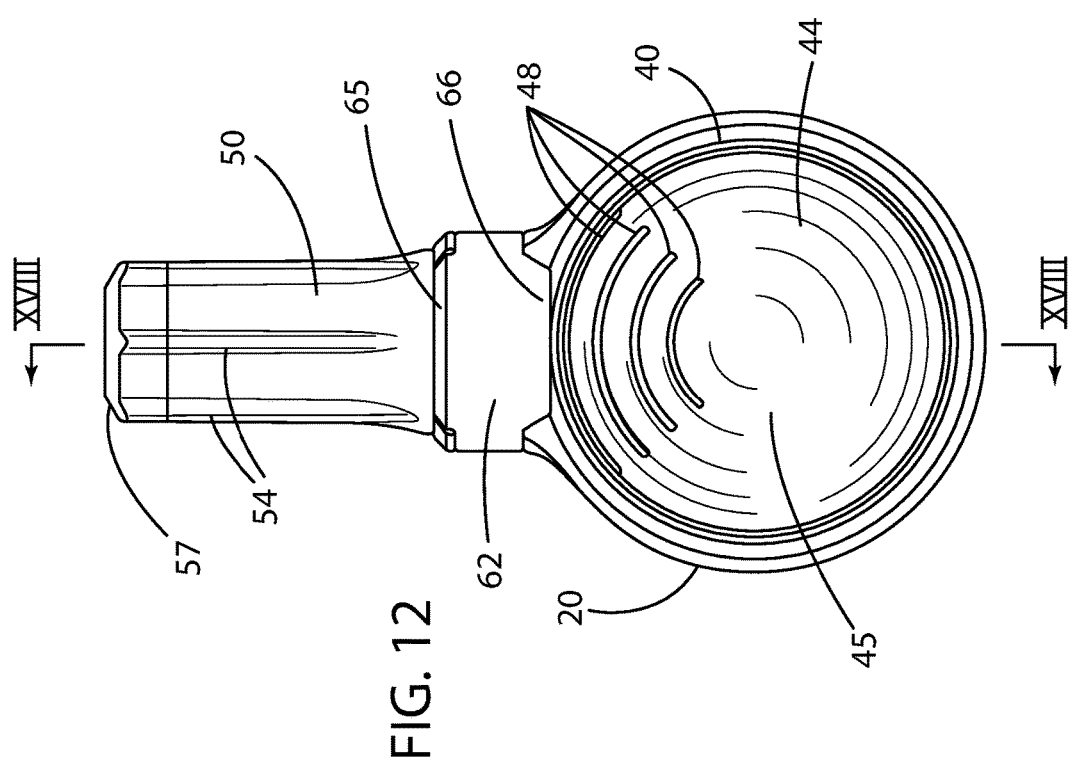
FIG. 12 is a top view of a scooping and dispensing device with the cover in the first position in accordance with an example embodiment.

As best shown in FIGS. 7, 8, and 12, the funnel 20 may include an internal funnel cavity 25. The funnel cavity 25 will preferably have sloped sidewalls so that gravity will naturally force materials 13 down toward the lower opening 24. The cover 40 is rotatably connected within the funnel cavity 25 as discussed below; with the cover 40 blocking the passage 27 and lower opening 24 of the funnel 20 when the cover 40 is in a first position as shown in FIG. 1. The cover 40 covers the upper opening 23 of the funnel 20 when the cover 40 is in a second, inverted position as shown in FIG. 2.

Figure 6:
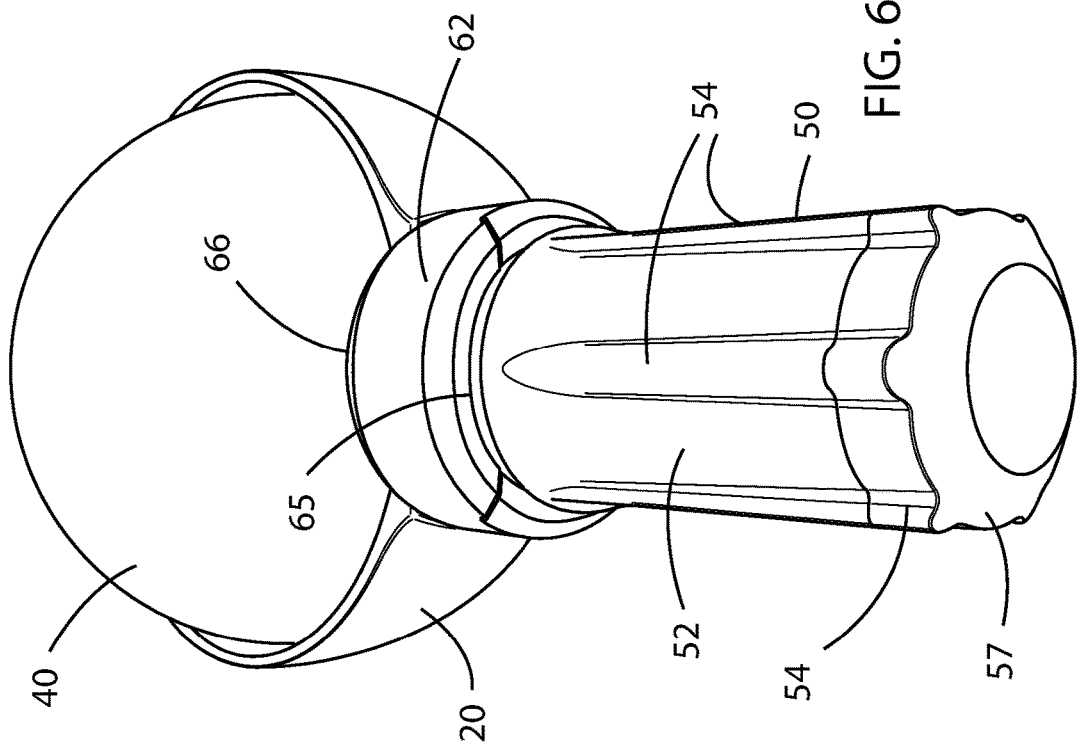
FIG. 6 is a rear perspective view of a scooping and dispensing device with the cover in the second, inverted position in accordance with an example embodiment.

As shown in FIGS. 6-8, the funnel 20 may include an aperture 28 at its front end. The aperture 28 is adapted to rotatably receive a corresponding rotator 43 on the cover 40, such as a projection meant to serve as an axle as shown in FIG. 8. This allows the cover 40 to rotate between its various positions within the funnel cavity 25.

Figure 5:
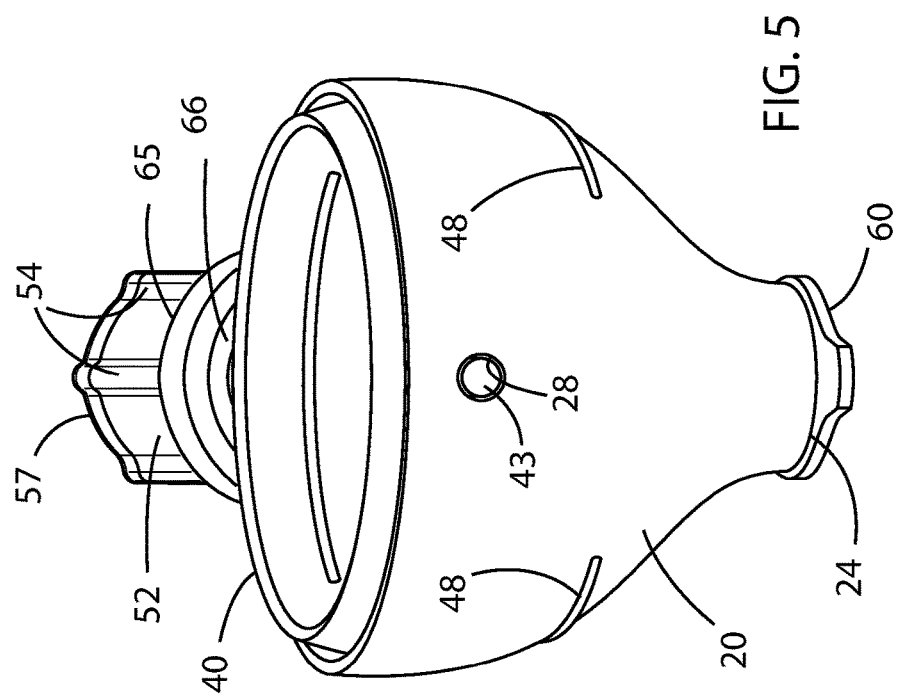
FIG. 5 is a frontal perspective view of a scooping and dispensing device with the cover in the first position in accordance with an example embodiment.
Figure 16:
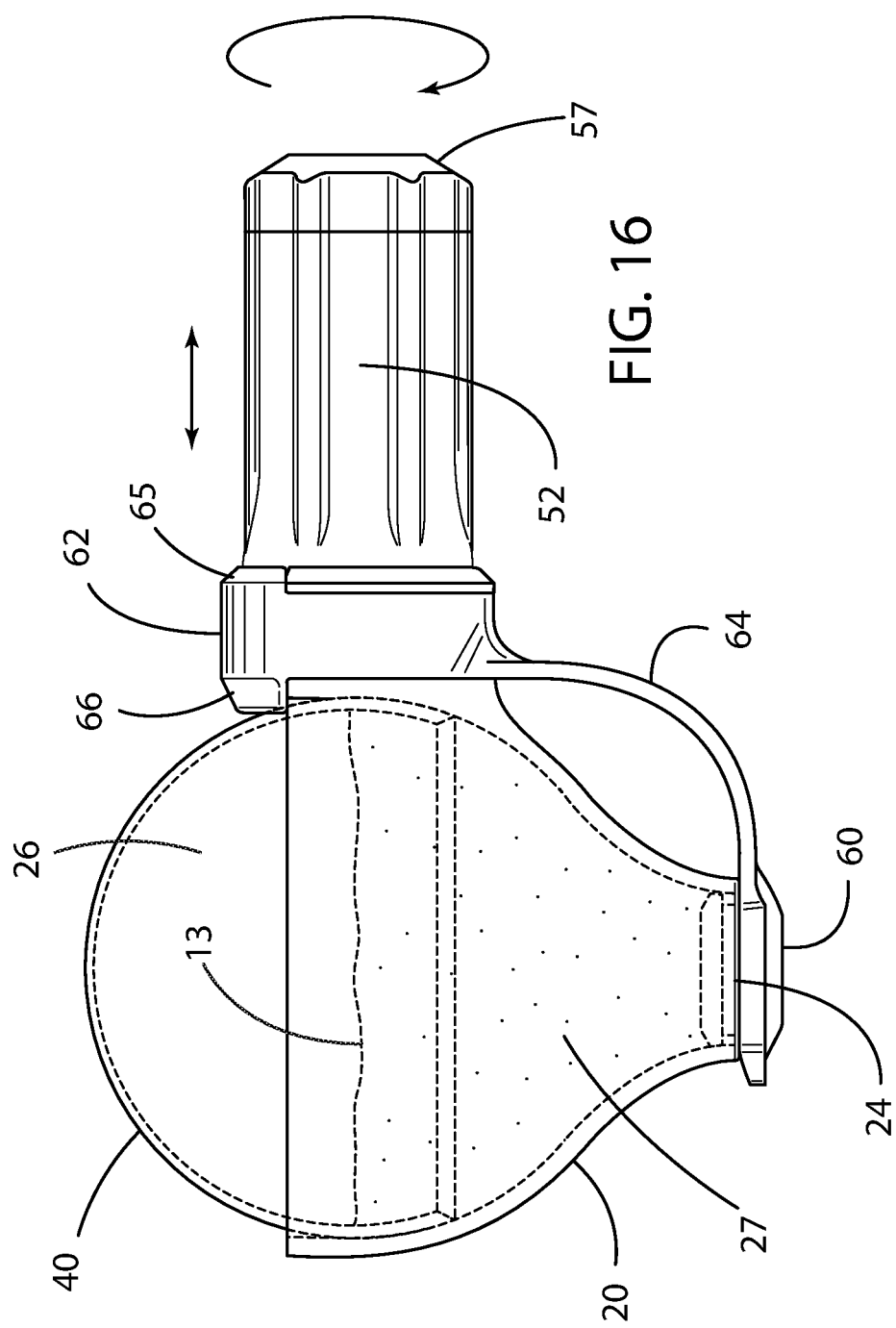
FIG. 16 is a side view of a scooping and dispensing device storing the material scooped from the container with the cover in the second position in accordance with an example embodiment.

The funnel cavity 25 will preferably be of a similar shape as the corresponding cover 40 such as shown in FIGS. 5, 7, and 8. When the cover 40 is in its first position, it will preferably fit within the funnel cavity 25 to block the passage 27 as shown in FIG. 5. When the cover 40 is inverted into its second position, the funnel 20 and cover 40 may form a chamber 26 such as shown in FIGS. 6 and 16. The chamber 26 formed between the funnel 20 and the inverted cover 40 may be utilized to store or mix materials 13. Preferably the chamber 26 will be sealed while the cap 60 is connected to cover the lower opening 24 of the funnel so as to prevent leakage of any materials 13 stored therein.

The rear end 22 of the funnel 20 may include a mount portion 30 which connects to and engages with both the handle 50 and the cap mount 62. The mount portion 30 may be integral with the funnel 20 such as shown in FIG. 7, or may be comprised of a separate, removable structure. In the exemplary embodiment shown in the figures, the mount portion 30 is illustrated as comprising a semi-cylindrical shape including an outer circumference 32 and an inner circumference 35. Various other shapes and configurations may be utilized for the mount portion 30 in the different embodiments.

Figure 3:
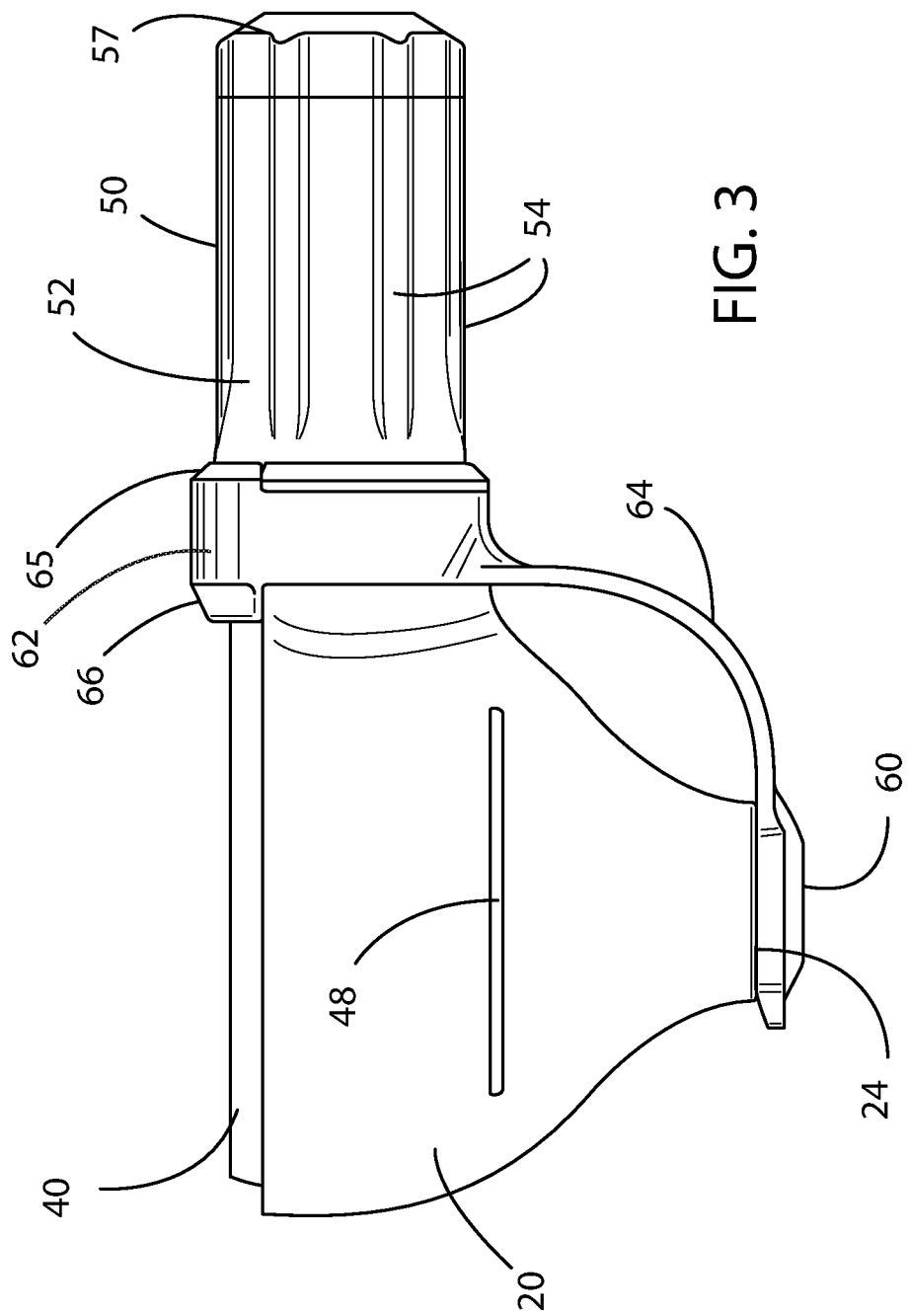
FIG. 3 is a side view of a scooping and dispensing device with the cap connected and the cover in the first position in accordance with an example embodiment.

The cover 40 is rotatably connected within the mount portion 30 of the funnel 20 as shown in FIGS. 2-3. In the embodiment shown in the exemplary figures, the cover 40 includes a base 46 which fits rotatably within the mount portion 30 of the funnel 20. Thus, the base 46 of the cover 40 will rotate within the mount portion 30 of the funnel 20 between the first and second positions.

The cover 40 will preferably be adapted to selectively lock into a plurality of rotational positions with respect to the funnel 20, such as between a first, upright position and a second, inverted position. The mount portion 30 may include one or more first locking members 34 on its inner circumference 35 such as shown in FIGS. 7 and 8. The first locking members 34, in conjunction with corresponding second locking members 47 on the base 46 of the cover 40, allow for the cover 40 to be locked in various rotational positions with respect to the mount portion 30 of the funnel 20.

Various methods and structures may be utilized to releasably lock the cover 40 in various rotational positions with respect to the funnel 20. In the exemplary figures, first locking members 34 are adapted to releasably engage with corresponding second locking members 47 on the cover 40 to selectively lock the cover 40 in either the first position or the second position.

In the exemplary figures, the first locking members 34 comprise grooves or slots on the inner circumference 35 of the mount portion 30. The second locking members 47 are illustrated in such an exemplary embodiment as comprising elongated, raised ribs on the base 46 of the cover 40 which releasably engage within the first locking members 34. It should be appreciated that alternate configurations may be utilized. For example, the first locking members 34 could comprise ribs while the second locking members 47 could comprise slots.

The mount portion 30 of the funnel 20 may act as a connection point between the cover 40 and the cap mount 62 as shown in FIG. 4; with the base 46 of the cover 40 fitting rotatably within the mount portion 30 to contact its inner circumference 35 and the cap mount 62 connected around both the outer circumference 32 of the mount portion 30 and the base 46 of the cover 40. The base 46 of the cover 40 rotates within both the mount opening 63 of the cap mount 62 and the mount portion 30 of the funnel 20.

The mount portion 30 of the funnel 20 may include a flange 31 on its outer circumference 32 which defines a groove 33 as best shown in FIGS. 7 and 8. The cap mount 62 may be connected within the groove 33 of the mount portion 30 such as shown in FIGS. 1-4. In the embodiment shown in the figures, the cap mount 62 is flush with the flange 31 when connected within the groove 33.

C. Cover.

As best shown in FIGS. 5-6, a cover 40 is rotatably connected within the funnel 20 such that the cover 40 may rotate between a plurality of rotational positions with respect to the funnel 20. In the exemplary embodiment shown in the figures, the cover 40 is rotatable between a first position as shown in FIG. 5 and a second position as shown in FIG. 6. In the first position, the cover 40 blocks the passage 27 of the funnel 20 and does not cover the upper opening 23 of the funnel 20. In the second position, the cover 40 covers the upper opening 23 of the funnel 20 and does not block the passage 27 of the funnel 20.

As shown in FIGS. 7 and 8, the cover 40 may comprise a semi-circular shape including a front end 41 and a rear end 42. The shape of the cover 40 will preferably substantially match the funnel cavity 25 of the funnel 20 as to be concentric with the funnel 20 as shown in FIG. 5. The cover 40 is shown as having a slightly smaller circumference as compared to the upper opening 23 of the funnel 20, which allows the cover 40 to rotate within the funnel cavity 25 of the funnel 20.

Figure 14:
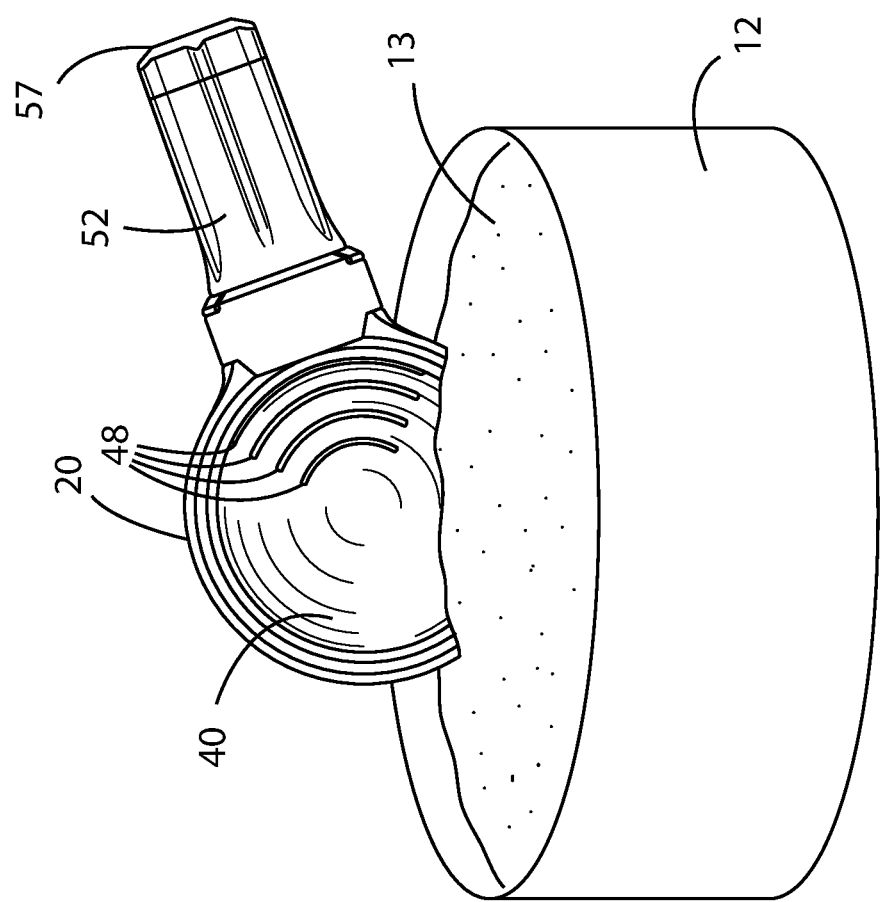
FIG. 14 is a side view of a scooping and dispensing device scooping the material from the container in accordance with an example embodiment.

The cover 40 may include a cover opening 24 which leads to a cover cavity 45 which may be utilized at times to store, transfer, dispense, and/or mix materials 13. When in the first, upright position, the cover cavity 45 is oriented upwardly so as to be exposed to receive materials 13. Materials 13 may be introduced into the cover cavity 45 when it is so oriented using any number of methods, such as by scooping from a container 12 as shown in FIG. 14, receiving materials 13 being poured from a container 12 as shown in FIG. 10, or receiving materials 13 being poured by the scoop insert 55 as shown in FIG. 18.

As shown in FIG. 12, the cover cavity 45 may include indicia 48 which provide information such as volume of a material 13 stored in the cover cavity 45. This can be useful for measuring materials 13 which are poured or scooped into the cover cavity 45. Various types of indicia 48 may be utilized, such as printed or molded lines as shown in the figures.

The cover 40 is rotatably connected within the funnel 20 as shown in FIGS. 5 and 6. In the embodiment shown, the cover 40 includes a base 46 which extends from the rear end 42 of the cover 40 as shown in FIG. 7. The base 46 may comprise a semi-cylindrical shape which is adapted to fit and rotate within the mount portion 30 of the funnel 20. The base 46 may frictionally engage with the inner circumference 35 of the mount portion 30 when the cover 40 is connected to the funnel 20.

The base 46 may include second locking members 47 such as elongated, raised ribs as shown in FIG. 7. The second locking members 47 may be positioned on the base 46 of the cover 40 such as shown in FIG. 7; with the second locking members 47 being adapted to removably and selectively engage with the corresponding first locking members 34 on the inner circumference 35 of the mounted portion 30 to releasably lock the cover 40 in various rotational positioned with respect to the funnel 20.

The cover 40 may be rotatably connected within the funnel 20 any number of methods or structures known in the art. In the exemplary figures, the cover 40 includes a rotator 43 at its front end 31 which engages with the aperture 28 on the front end 21 of the funnel 20. Thus, the front end 41 of the cover 40 may be rotatably connected to the front end 21 of the funnel 20 by the rotator 43 being rotatably connected within the aperture 28 such as shown in FIG. 5. The rotator 43 may comprise a projection such as shown in the figures which is easily removed from the corresponding aperture 28 on the funnel 20 allow for disassembly for cleaning or storage.

D. Handle.

As best shown in FIG. 7, the funnel 20 may include a handle 50 which extends outwardly from the rear end 22 of the funnel 20. The handle 50 may be connected to the mount portion 30 of the funnel 20 such as shown in FIG. 7. The handle 50 may be integrally formed with the mount portion 30 and the funnel 20, such as by molding, or may be removably connected. In the exemplary figures, the funnel 20, mount portion 30, and handle 50 are shown as being a single piece.

The handle 50 may comprise any shape, size, or configuration and should not be construed as limited by the exemplary figures. In the figures, the handle 50 is shown as comprising a cylindrical, elongated member having a plurality of ribs 54 for ergonomics. The handle 50 is adapted to be rotated so as to allow mount portion 30 to rotate within the base 46 and the funnel 20 to rotate within the cover 40.

The handle 50 may comprise a grip portion 52 having a receiver opening 53 such as shown in FIG. 18. The receiver opening 53 may comprise a semi-circular shape so as to prevent rotation of a removably inserted scoop insert 55. The scoop insert 55 may comprise a scoop cavity 56 adapted to scoop materials 13 from a container 12. The scoop insert 55 may be utilized to transfer materials 13 from a container 12 into the cover 40 when the cover opening 44 is exposed in the first, upright position such as shown in FIG. 18. The scoop insert 55 may alternately or additionally be utilized to store materials 13 within the handle 50 such as shown in FIGS. 19 and 20.

In some embodiments, the scoop insert 55 may be utilized to separate and contain two different materials 13 in the same scooping and dispensing device 10. One such embodiment is shown in FIG. 20. As can be seen, a first material 13 is stored in the chamber 26 between the funnel 20 and the cover 40 while a second material 13 is stored in the scoop cavity 56 of the scoop insert 55 within the receiver opening 53 of the handle 50. This would be particularly useful for storing an additional nutritional supplement powder or other material 13 separate from the primary material 13 stored in the chamber 26.

The shape, size, and configuration of the scoop insert 55 and scoop cavity 56 may vary in different embodiments. As shown in FIGS. 1-4, a handle cap 57 may be utilized to create a tight fit when the scoop insert 55 is removably inserted within the grip portion 52 of the handle 50. Preferably, when the scoop insert 55 is so inserted, the scoop cavity 56 is sealed within the grip portion 52 so that materials 13 do not leak outside the handle 50. The handle cap 57 may include ribs 54 which are continuous with the ribs 54 of the grip portion 52 when the scoop insert 55 is removably connected within the receiver opening 53 of the grip portion 52.

E. Cap.

As shown throughout the figures, a cap 50 may be utilized to selectively cover the lower opening 24 of the funnel 20. When the cap 50 is installed to cover the lower opening 24 of the funnel 20, the materials 13 will be prevented from exiting the funnel 20 even when the cover 40 is inverted. The cap 50 is preferably removably connected to the lower opening 24 of the funnel 20 such that the cap 50 may be easily connected or disconnected from the funnel 20.

To prevent loss of the cap 50 when it is not in use, the cap 50 may be connected to the funnel 20, cover 40, or handle 50, such as by a strap, string, bracket, or the like which allows the cap 50 to be suspended from or otherwise interconnected with the scooping and dispensing device 10 even when the cap 50 is not connected to the lower opening 24 of the funnel 20.

An exemplary embodiment illustrating the cap 50 being connected to the mount portion 30 of the funnel 20 and the base 46 of the cover 40 by an elongated, flexible cap connector 64 is shown in FIG. 2. In such an embodiment, a cap mount 62 comprising a circular member having a mount opening 63 may be utilized. The cap mount 62 fits around both the mount portion 30 of the funnel 20 and the base 46 of the cover 40 as shown in FIGS. 1-4.

As shown in FIGS. 1-4, the cap connector 64 is connected between the cap mount 62 and the cap 60. The cap connector 64 may comprise an elongated, flexible member such as a strap, string, or the like which is utilized to suspend the cap 60 from the scooping and dispensing device 10 when the cap 60 is not connected to cover the lower opening 24 of the funnel 20 such as shown in FIGS. 1 and 2. The cap 60 may then be easily retrieved anytime it is needed to cover the lower opening 24 of the funnel 20.

FIGS. 3-4 best illustrate the cap 60 removably connected to the lower opening 24 of the funnel 20. The manner in which the cap 60 is connected to the funnel 20 may vary in different embodiments and should not be construed as limited by the exemplary figures. In FIGS. 3-4, the cap 60 is illustrated as being comprised of a malleable material such as rubber or plastic which may frictionally engage with the lower opening 24 as a plug. When the lower opening 24 of the funnel 20 is plugged by the cap 60, materials 13 will be retained in the chamber 36 of the funnel 20 even when the cover 40 is inverted so as not to cover the lower opening 24.

As best shown in FIG. 7, the cap mount 62 may comprise a pair of flanges 65, 66 extending outwardly from its respective outer and inner ends. These flanges 65, 66 create extra width at the top of the cap mount 62 and may be grasped or contacted by an individual when rotating the handle 50. For example, an individual may place his/her thumb on the top of the cap mount 62 when rotating the handle 50 within the cap mount 62. In the exemplary figures, an outer flange 65 extends in a first direction from an upper end of the cap mount 62 and an inner flange 66 extends in a second direction from the upper end of the cap mount 62.

F. Operation of Preferred Embodiment.

In use, the cover 40 begins in its first, upright position in which the cover opening 44 is upright to expose the cover cavity 45. The first and second locking members 34, 47 may be engaged to releasably lock the cover 40 in its first position. The cap 60 is connected to the funnel 20 so as to plug and cover its lower opening 24, which will prevent materials 13 from prematurely being dispensed. One or more materials 13 are introduced into the cover cavity 45 of the cover 40.

Figure 13:
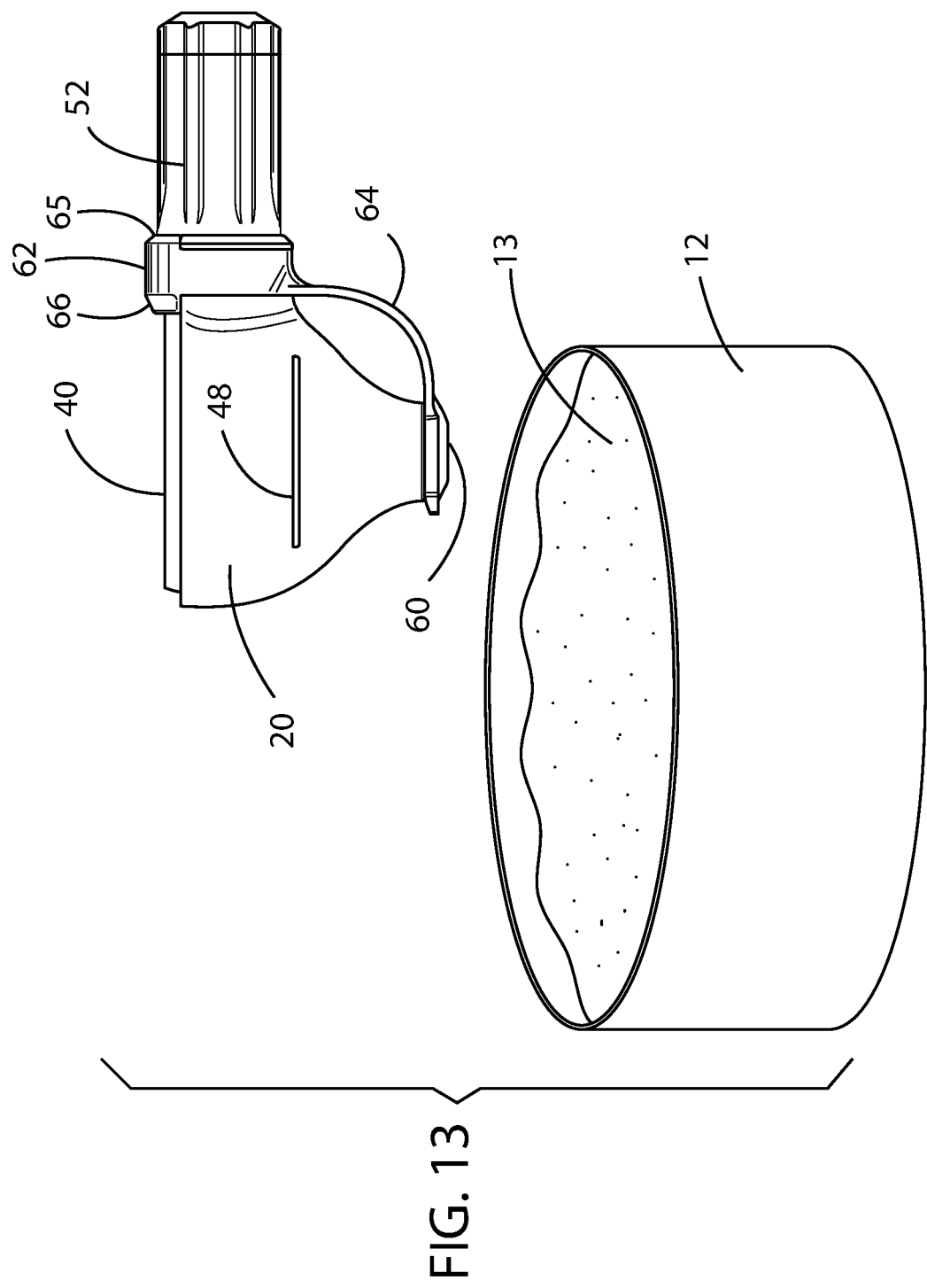
FIG. 13 is a side view of a scooping and dispensing device in position to scoop a material from a container in accordance with an example embodiment.
Figure 15:
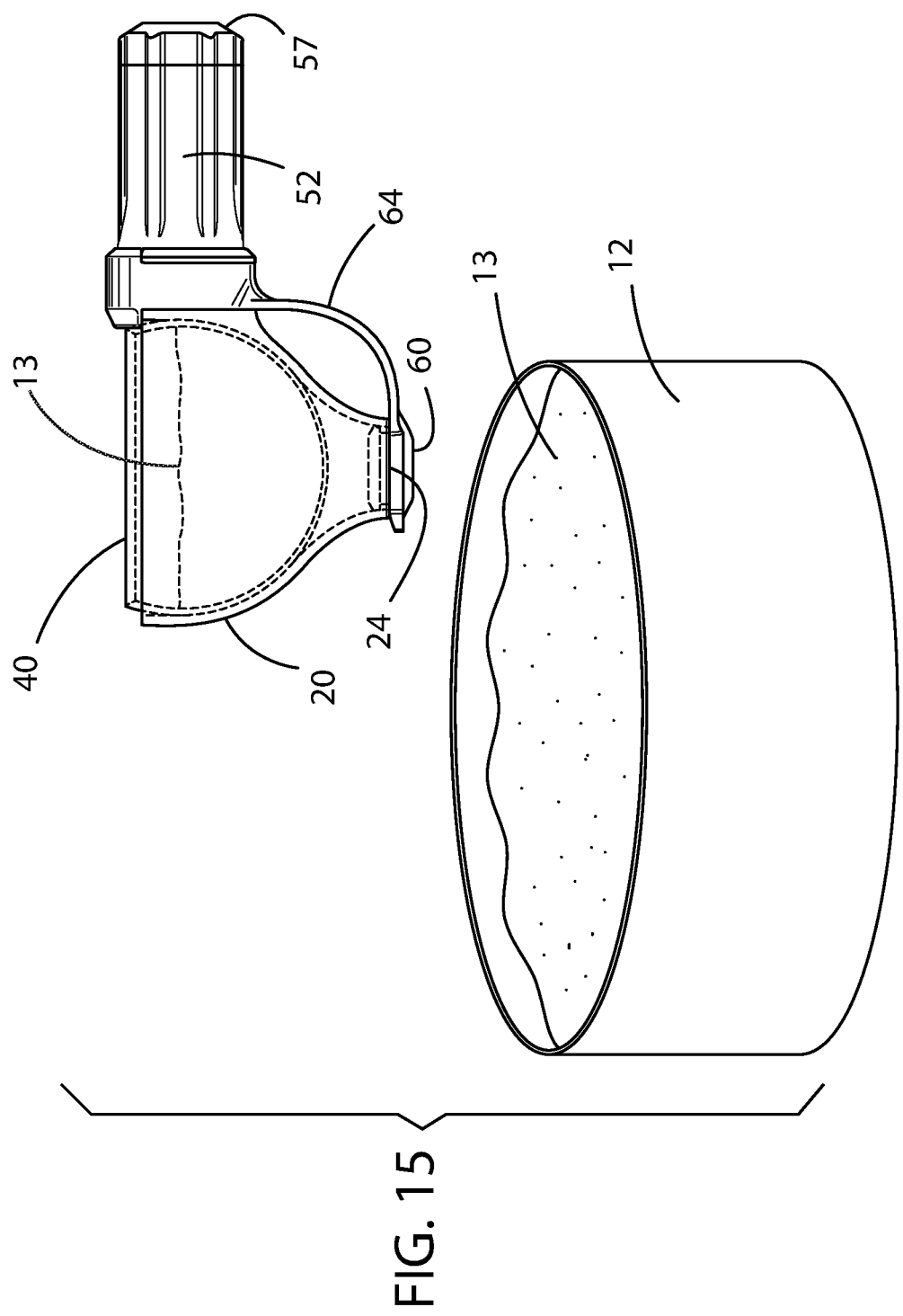
FIG. 15 is a side view of a scooping and dispensing device storing the material scooped from the container with the cover in the first position in accordance with an example embodiment.

The manner in which materials 13 are transferred into the cover cavity 45 may vary in different embodiments. In FIGS. 13-15, the scooping and dispensing device 10 is illustrated as scooping materials 13 from a container 12 by forcing the cover 40 through a volume of the materials 13 such that the materials 13 enter and remain in the cover cavity 45. In FIG. 18, the scoop insert 55 has been removed from the receiver opening 53 on the grip portion 52 of the handle 50 and is utilized to scoop materials 13 from a container 12 into the cover cavity 45. In FIG. 10, two different materials 13a, 13b are shown being poured directly into the cover cavity 45 from their own containers 12a, 12b.

After the materials 13 have been introduced into the cover cavity 45 of the cover 40, the cover 40 may be rotated into its second, inverted position. As shown in FIGS. 19-20, the rotation of the cover 40 into the inverted position transfers the materials 13 from the cover cavity 45 to the funnel cavity 25 of the funnel 20. The upper opening 23 of the funnel 20 is covered by the cover 40 when the cover 40 is in such an inverted position.

The manner in which the cover 40 is rotated with respect to the funnel 20 may vary in different embodiments. In the exemplary embodiment shown in the figures, the handle 50 is grasped by a user and twisted. The user may grasp the mount portion 30 of the funnel 20 with the other hand to aid with rotation of the cover 40 via the handle 50. As shown in FIGS. 19-20, the base 46 of the cover 40 rotates within both the mount portion 30 of the funnel 20 and the mount opening 63 of the cap 60.

As the handle 50 is rotated, the rotator 43 on the front end 41 of the cover 40 rotates within the aperture 28 on the front end 21 of the funnel 20; thus acting similar to an axle with the cover 40 rotating about an axis extending through the rotator. When the cover 40 has been rotated to its second, inverted position, the locking members 34, 47 will engage to releasably lock the cover 40 in the inverted position absent application of sufficient force to disengage the locking members 34, 47 and continue rotation of the cover 40 back into its first position.

As shown in FIG. 20, the inversion of the cover 40 forms a chamber 26 defined between the funnel 20 and the cover 40. The chamber 26 is preferably sealed so as to prevent premature or inadvertent leakage of materials 13 from the chamber 26; particularly if multiple materials 13 are being mixed therein. When the cover 40 is inverted, the materials 13 will naturally fall into the funnel cavity 25 and be forced by gravity down toward the lower opening 24. The cap 60 will prevent the materials 13 from exiting the chamber 26 via the lower opening 24 until desired.

In some situations, multiple materials 13 may be desired to be mixed. The scooping and dispensing device 10 may be utilized to mix any number of materials 13 together. FIGS. 10-11 illustrate a first material 13a from a first container 12a being mixed with a second material 13b from a second container 12b. In this exemplary embodiment, the first and second materials 13a, 13b are each introduced, such as by pouring, into the cover cavity 46 when the cover 40 is in its inverted position. The cover 40 is then rotated to invert the cover cavity 46 and force both materials 13a, 13b into the funnel cavity 25 to be sealed in the chamber 26. The scooping and dispensing device 10 may then be shaken or otherwise moved around to mix the materials 13a, 13b together.

The interior of the cover cavity 45 may include indicia 48 to show a volume of materials 13 within the cover 40. Additional indicia 48 may be included in other locations, such as on the exterior of the funnel 20 as shown in the figures. The indicia 48 may be utilized to measure a volume of one or more materials 13 when being transferred into the cover 40. This may be particularly useful when mixing multiple materials 13 together.

With the cover 40 inverted and one or more materials 13 in the chamber 26, the scooping and dispensing device 10 may be transported, stored, or used for dispensing the materials 13. The scoop insert 55 may be utilized to store additional material 13 separate from the materials 13 stored in the chamber 26. The additional material 13 stored in the scoop insert 55 may be the same as the materials 13 stored in the chamber 26 or may comprise a different material 13.

For example, if materials 13 are not meant to be mixed except immediately before consumption, a second material 13 could be stored in the scoop insert 55 within the receiver opening 53 of the grip portion 52 of the handle 50 while a first material 13 could be stored in the chamber 26. The materials 13 could be mixed together at a later time immediately before consumption by pouring the second material 13 from the scoop insert 55 into the cover cavity 45 with the cover 40 in its first, upright position.

Figure 17:
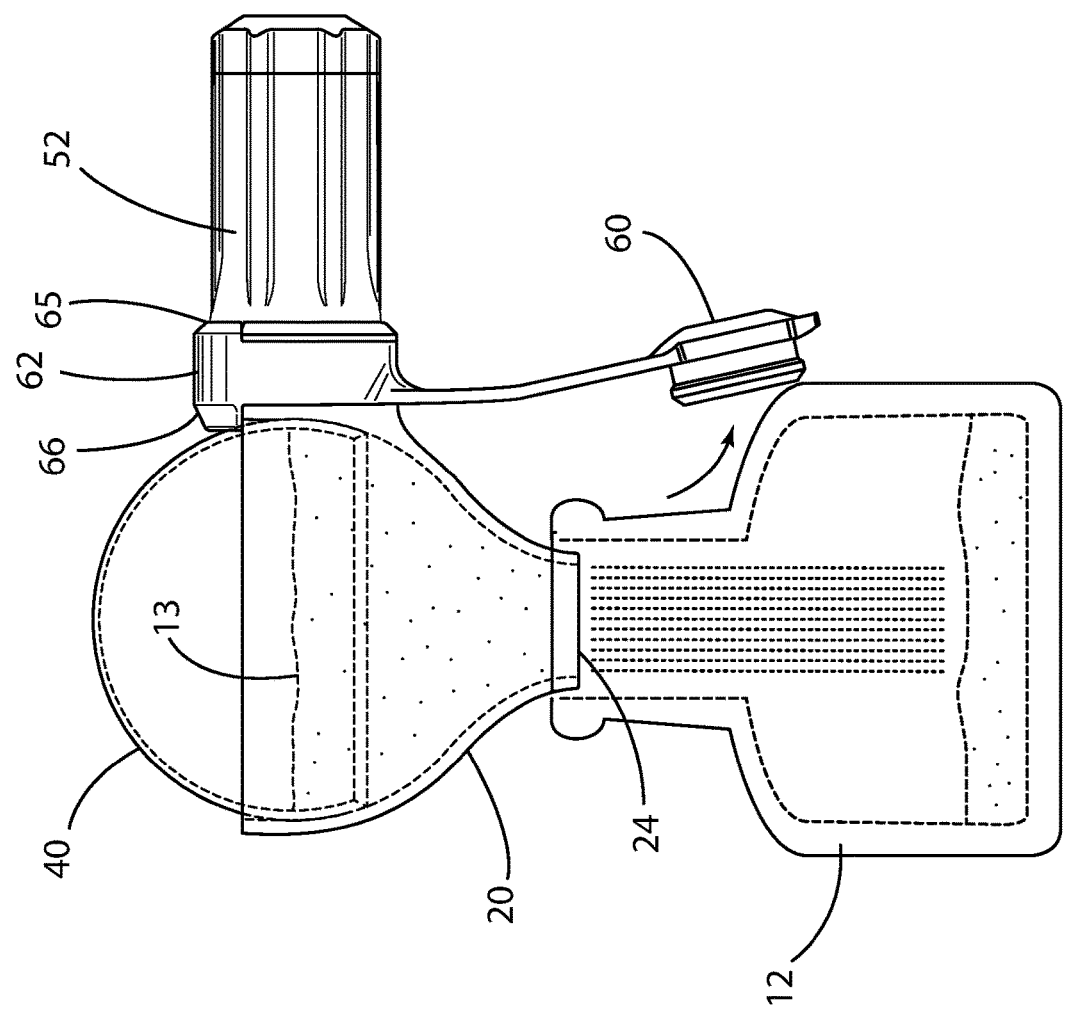
FIG. 17 is a side view of a scooping and dispensing device dispensing the material into a separate container in accordance with an example embodiment.

With materials 13 stored in the chamber 26 formed between the funnel 20 and the inverted cover 40, the materials 13 may be dispensed at any time. The cap 60 need only be removed from the lower opening 24 of the funnel 20 with the lower opening 24 of the funnel 20 positioned over a container 12 adapted to receive the material 13 such as shown in FIG. 17. The lower opening 24 of the funnel 20 may fit within the container 12 as shown or may simply be positioned directly above the container 12 such that the materials 13 naturally fall into the container 12 when the cap is removed 60.

The cap 60 will remain connected to the scooping and dispensing device 10 by the cap connector 64. After dispensing is completed, the cap 60 may be again connected to the lower opening 24 of the funnel 20. With the cap 60 in place, the cover 40 may be rotated back into the first, upright position and is then ready for use with additional materials 13.

Unless otherwise defined, all technical and scientific terms used herein have the same meaning as commonly understood by one of ordinary skill in the art to which this invention belongs. Although methods and materials similar to or equivalent to those described herein can be used in the practice or testing of the scooping and dispensing device, suitable methods and materials are described above. All publications, patent applications, patents, and other references mentioned herein are incorporated by reference in their entirety to the extent allowed by applicable law and regulations. The scooping and dispensing device may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A scooping and dispensing device, comprising:
    a funnel including an upper opening and a lower opening, wherein the funnel comprises a passage between the upper opening and the lower opening, wherein the passage narrows between the upper opening and the lower opening, wherein the lower opening of the funnel is narrower than the upper opening of the funnel;
    a cover rotatably connected to the funnel, the cover being rotatably adjustable between a first position in which the cover blocks the passage and a second position in which the cover fully covers the upper opening of the funnel; and
    a handle connected to the cover such that the handle may be rotated to rotate the cover between the plurality of positions.

2. The scooping and dispensing device of claim 1, wherein the cover comprises a cover opening and a cover cavity.

3. The scooping and dispensing device of claim 2, wherein the cover comprises a semi-spherical shape.

4. The scooping and dispensing device of claim 2, wherein the cover comprises a plurality of indicia adapted to indicate a volume of a material within the cover cavity.

5. The scooping and dispensing device of claim 2, wherein the cover cavity is exposed to receive a material when the cover is in the first position.

6. The scooping and dispensing device of claim 1, further comprising a cap removably connected to the lower opening of the funnel.

7. The scooping and dispensing device of claim 6, further comprising a cap mount connected between the handle and the funnel.

8. The scooping and dispensing device of claim 7, wherein the cap is connected to the cap mount by a cap connector, wherein the cap connector is flexible.

9. The scooping and dispensing device of claim 1, wherein the handle comprises a grip portion including a receiver opening and a scoop insert slidably connected within the receiver opening.

10. The scooping and dispensing device of claim 9, wherein the scoop insert comprises a scoop cavity adapted to transfer a material into the cover when the cover is in the first position.

11. A scooping and dispensing device, comprising:
    a funnel including an upper opening, a lower opening, and a passage between the upper opening and the lower opening, wherein the funnel comprises a funnel cavity for storing a first material;
    a cover rotatably connected to the funnel, wherein the cover comprises a cover cavity for receiving the material, the cover being rotatably adjustable between a first position blocking the passage of the funnel and a second position fully covering the upper opening of the funnel, wherein rotation of the cover from the first position to the second position is adapted to transfer the material from the cover cavity to the funnel cavity;
    a handle connected to the cover such that the handle may be rotated to rotate the cover between the first position and the second position; and
    a cap removably connected to the lower opening of the funnel.

12. The scooping and dispensing device of claim 11, further comprising a sealed chamber defined between the cover and the funnel when the cover is in the second position and the cap is connected to the lower opening of the funnel.

13. The scooping and dispensing device of claim 11, wherein the funnel comprises a first locking member and the cover comprises a second locking member.

14. The scooping and dispensing device of claim 13, wherein the first locking member is adapted to selectively engage with the second locking member to lock the cover in the first position or the second position.

15. The scooping and dispensing device of claim 14, wherein the first locking member comprises a rib and wherein the second locking member comprises a slot for selectively engaging with the rib.

16. The scooping and dispensing device of claim 11, wherein the handle comprises a grip portion including a receiver opening and a scoop insert slidably connected within the receiver opening.

17. The scooping and dispensing device of claim 16, wherein the scoop insert comprises a scoop cavity adapted to hold a second material.

18. The scooping and dispensing device of claim 11, further comprising a cap mount connected between the handle and the funnel, wherein the cap is connected to the cap mount by a cap connector, wherein the cap connector is flexible.

19. A scooping and dispensing device, comprising:
  a funnel including an upper opening and a lower opening, wherein the funnel comprises a passage between the upper opening and the lower opening, wherein the passage narrows between the upper opening and the lower opening, wherein the lower opening of the funnel is narrower than the upper opening of the funnel;
  a cover rotatably connected to the funnel, the cover being adapted to rotatably adjust between a plurality of positions with respect to the funnel, wherein the plurality of positions comprises a first position in which the cover is adapted to block the passage; and
  a handle connected to the cover such that the handle may be rotated to rotate the cover between the plurality of positions, wherein the handle comprises a grip portion including a receiver opening and a scoop insert slidably connected within the receiver opening, wherein the scoop insert comprises a scoop cavity adapted to transfer a material into the cover when the cover is in the first position.

* * * * *